Nov. 4, 1941.   J. W. CARLSON   2,261,338
DRINK VENDING MACHINE
Filed Oct. 27, 1939   9 Sheets-Sheet 4
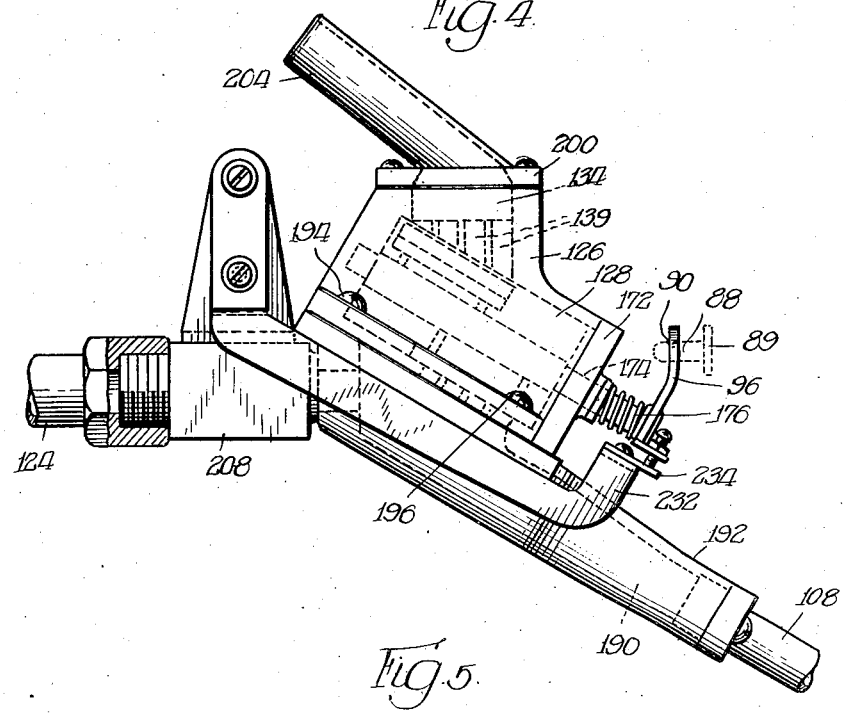
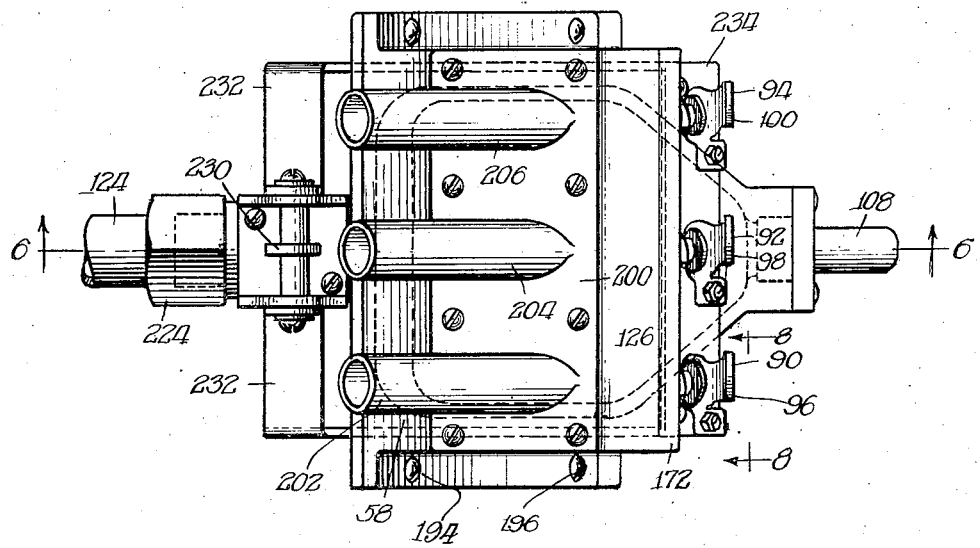
INVENTOR.
John W. Carlson,
BY Richard Spencer
ATTORNEY.

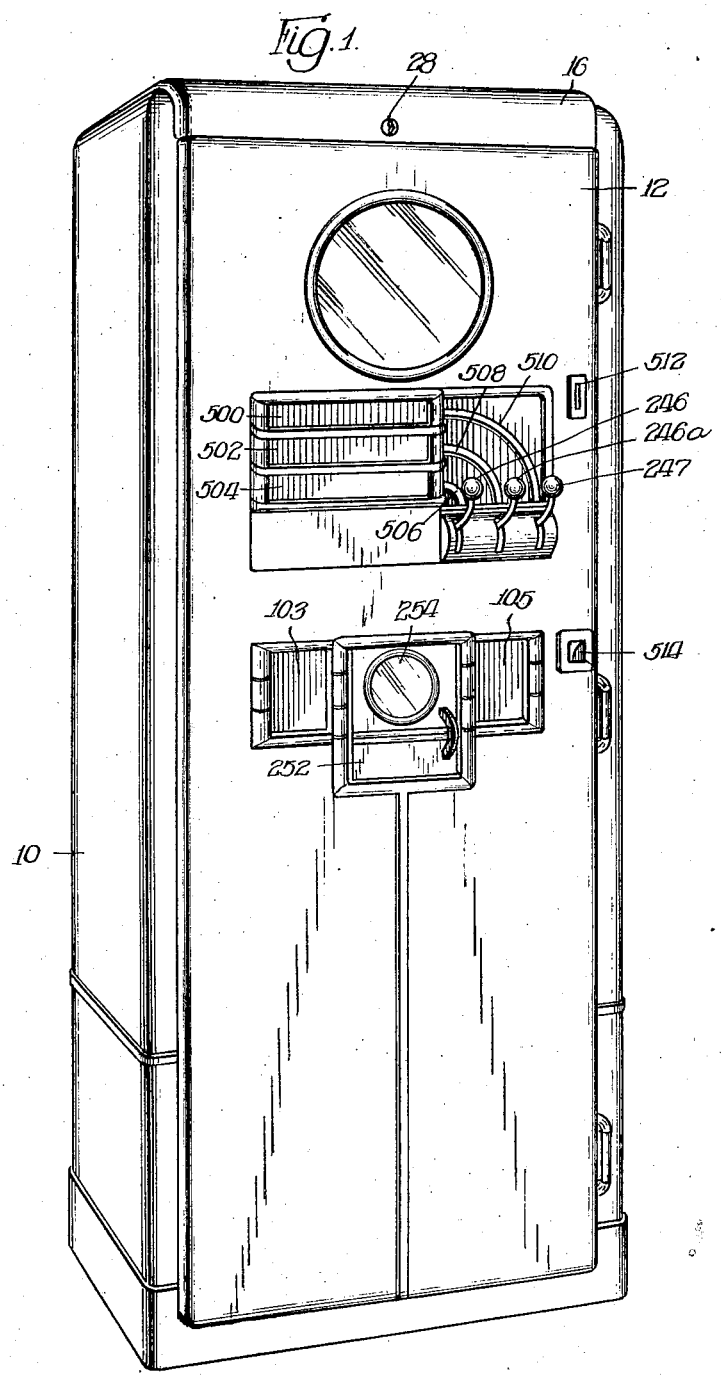

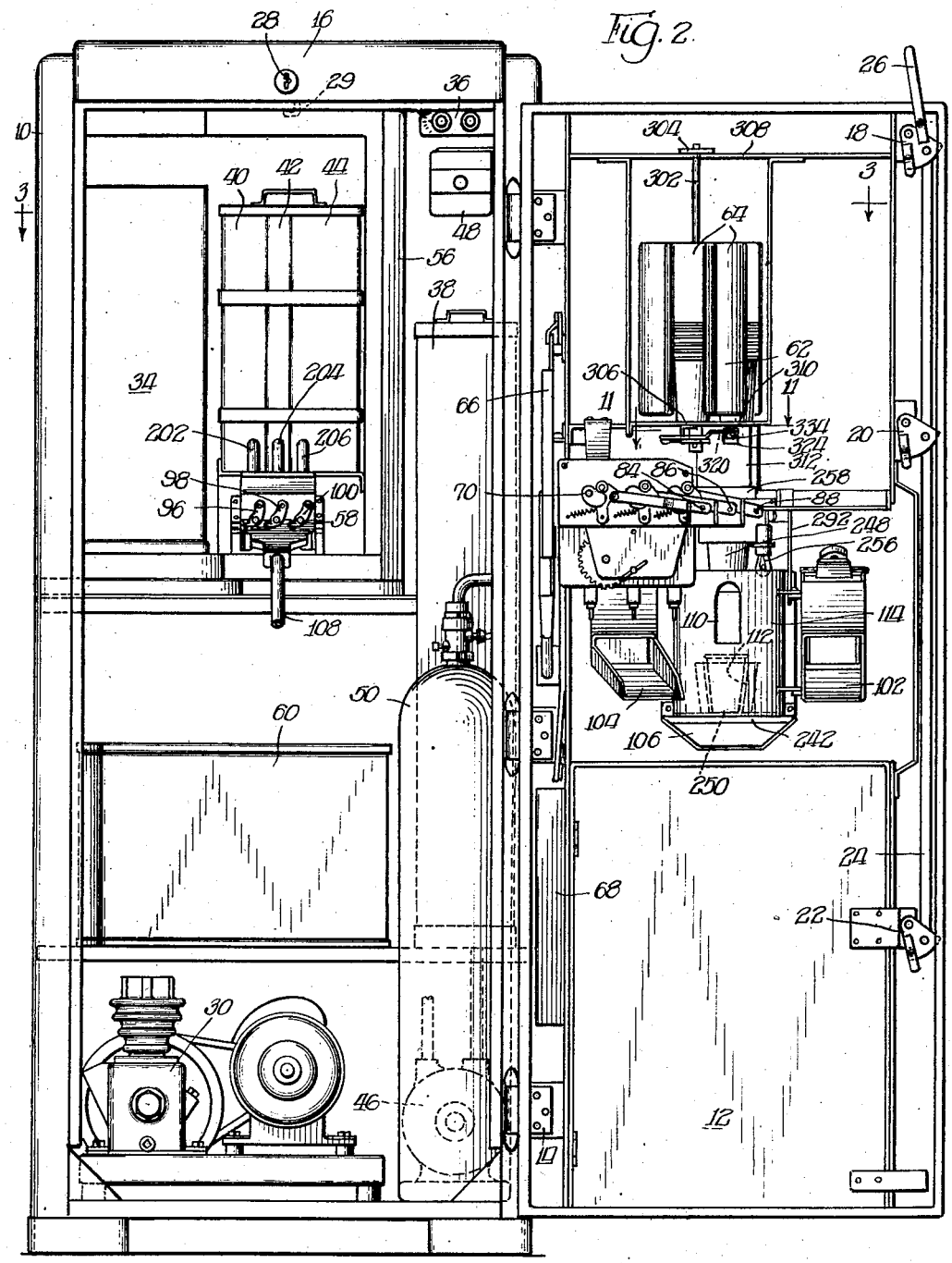

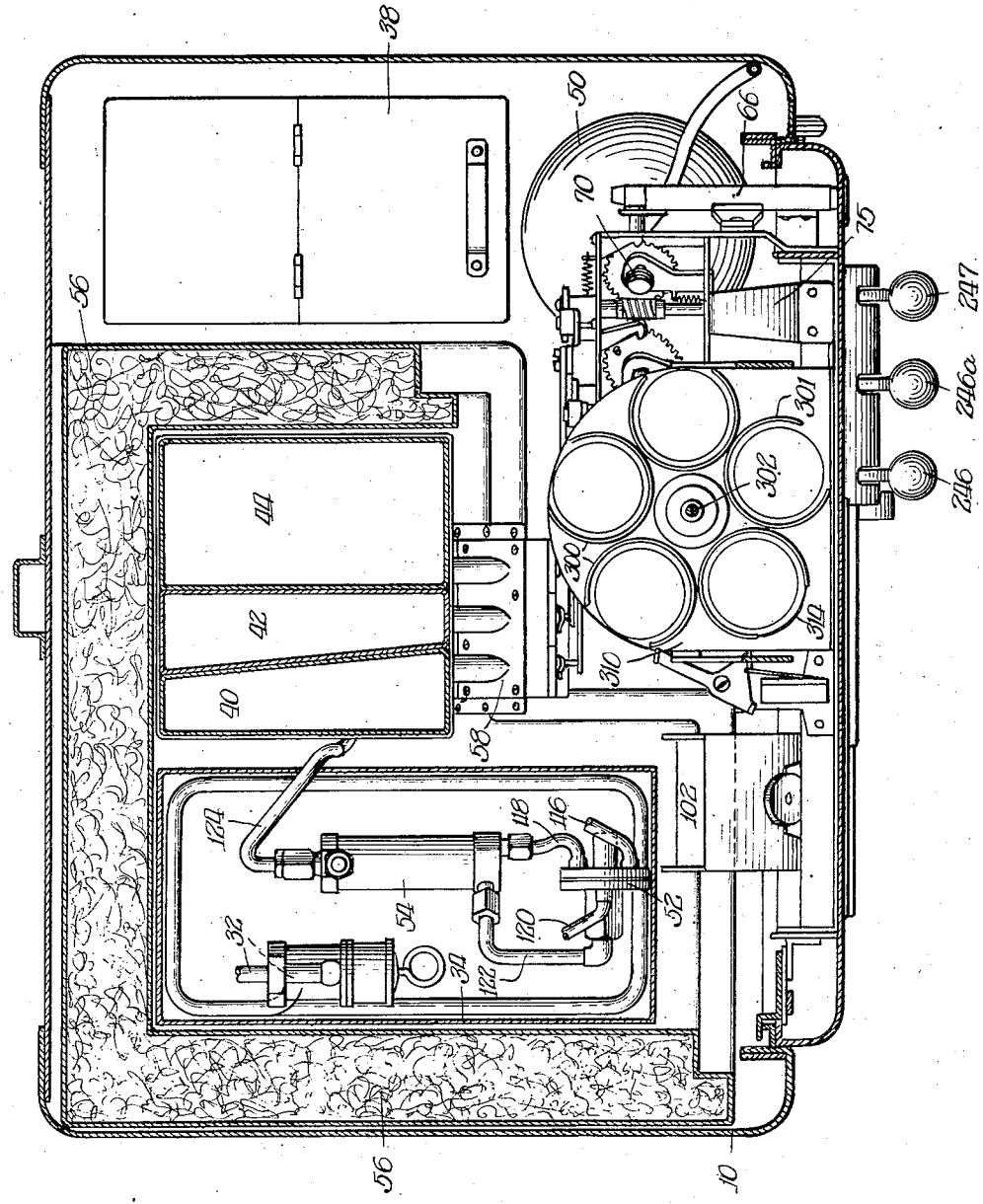

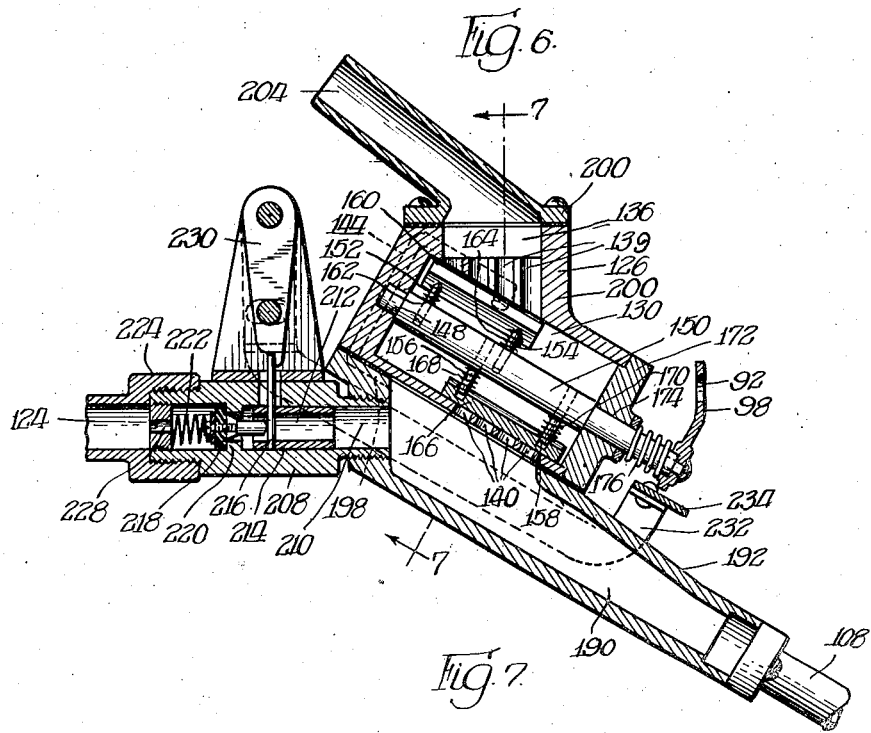
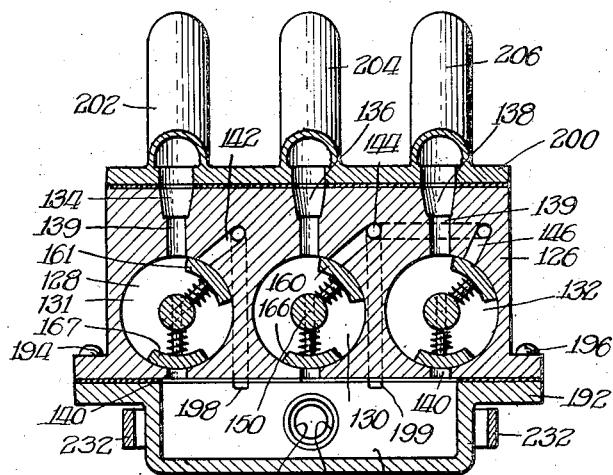
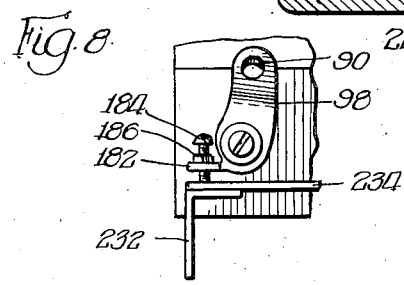

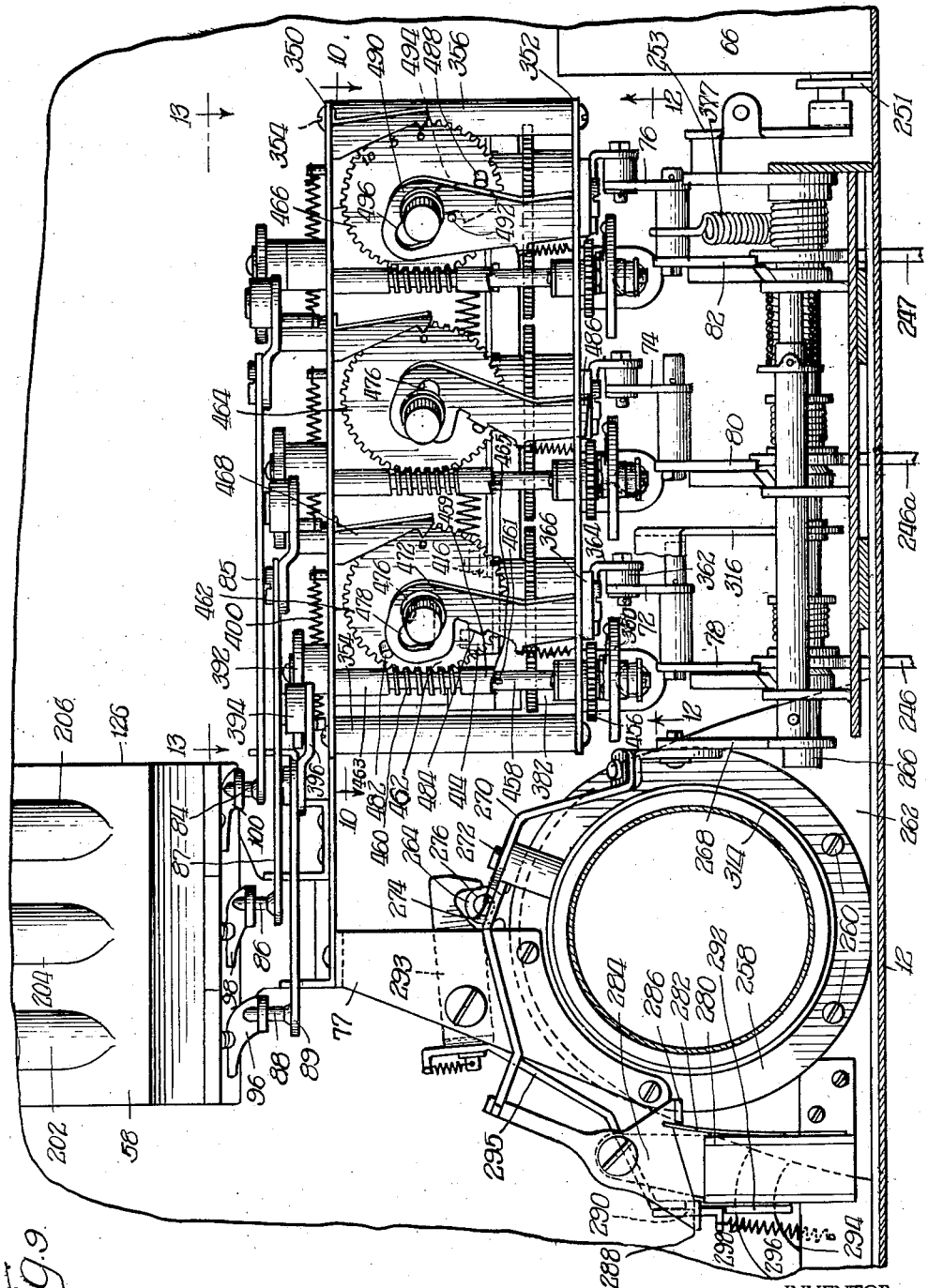

Nov. 4, 1941.         J. W. CARLSON         2,261,338
                    DRINK VENDING MACHINE
                    Filed Oct. 27, 1939         9 Sheets-Sheet 7
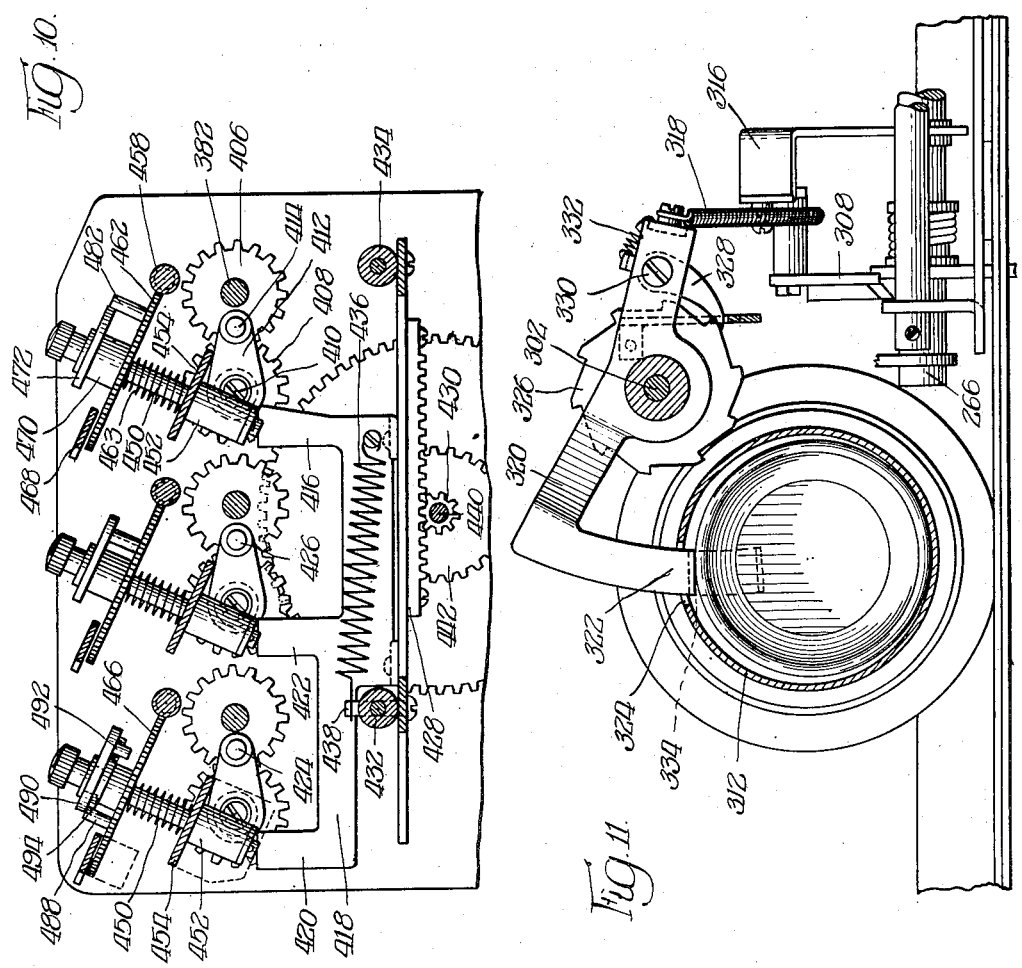
INVENTOR.
John W. Carlson
BY
ATTORNEY.

Nov. 4, 1941.  J. W. CARLSON  2,261,338
DRINK VENDING MACHINE
Filed Oct. 27, 1939  9 Sheets-Sheet 8
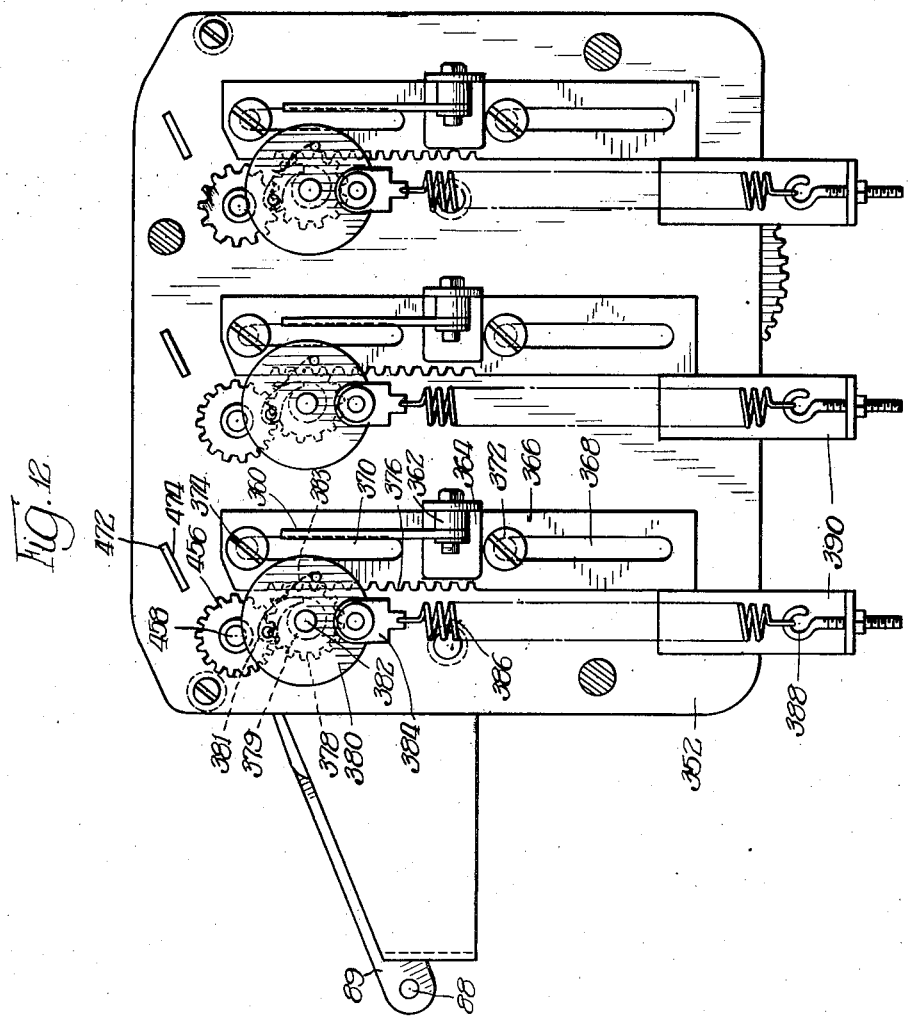
INVENTOR.
John W. Carlson,
BY Richard Spencer
ATTORNEY.

Nov. 4, 1941.  J. W. CARLSON  2,261,338
DRINK VENDING MACHINE
Filed Oct. 27, 1939   9 Sheets-Sheet 9
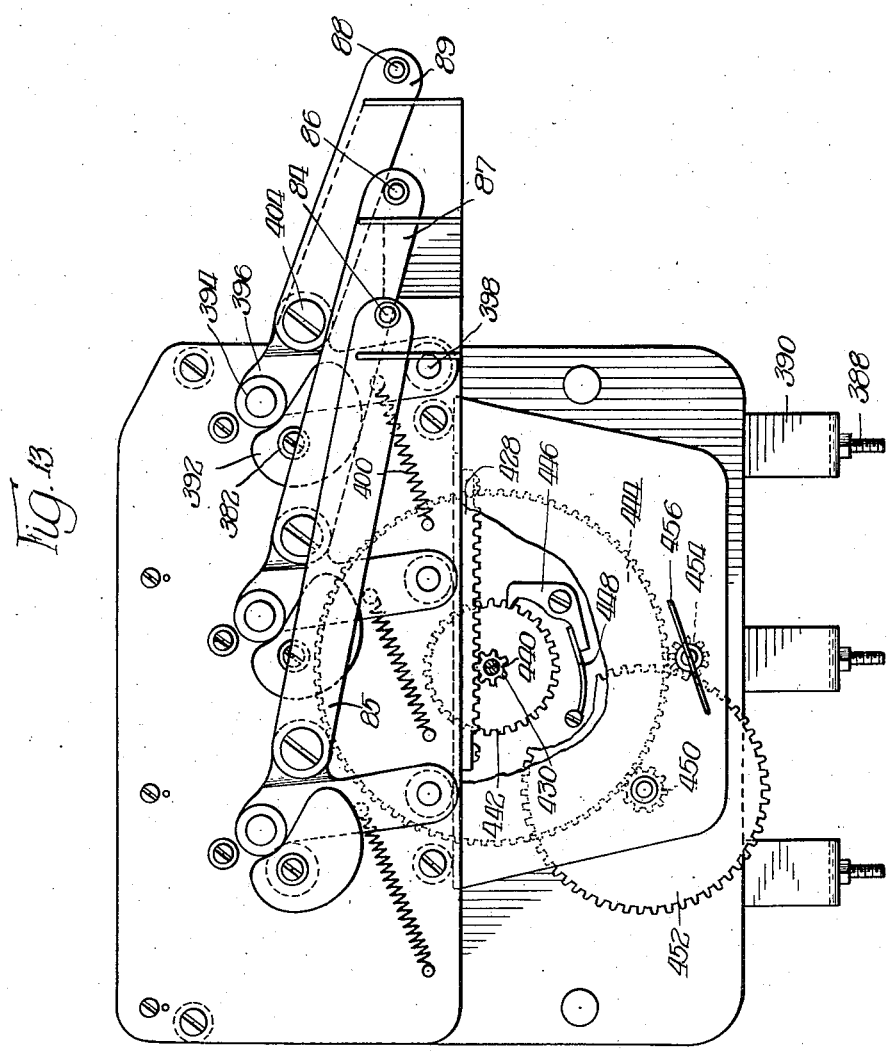
INVENTOR.
John W. Carlson,
BY
ATTORNEY.

Patented Nov. 4, 1941

2,261,338

UNITED STATES PATENT OFFICE 2,261,338

DRINK VENDING MACHINE

John W. Carlson, Chicago, Ill., assignor to Automatic Canteen Company of America, Chicago, Ill., a corporation of Delaware Application October 27, 1939, Serial No. 301,528

26 Claims. (Cl. 225—21)

This invention relates to vending machines, and as illustrated herein is embodied in a coin-controlled machine for selectively dispensing any one of a plurality of beverages in bulk. The term "bulk dispenser" is employed herein to distinguish from machines which are designed to vend or dispense beverages in bottles or other similar containers. A machine of the class to which the present invention pertains is exemplied in United States Patent No. 1,637,808, granted August 2, 1927, upon application of W. C. DeArmond et al.

A principal object of the present invention resides in the provision of a selective vending machine of the type described which is more simple in design and construction and more efficient in operation than the machines of the prior art. Generally speaking, the machine which forms the subject matter of this invention comprises a cabinet within which is located a plurality of instrumentalities for use in mixing and dispensing a carbonated beverage. These include a storage tank for water, a storage tank for carbon dioxide, a carbonator for admixing the water and the carbon dioxide to produce carbonated water, a plurality of syrup tanks, valves for measuring and controlling the admission of syrup to a common mixing chamber, a valve for controlling the admission of carbonated water to the mixing chamber, an automatic mechanism for dispensing magazined cups singly into a position to be filled by the admixed liquid flowing from the mixing chamber, a mechanism for actuating the aforementioned valves, and means for refrigerating various of the instrumentalities.

One of the features of the invention which contributes to the accomplishment of the above recited object consists in constructing and arranging the various instrumentalities of the machine in such a manner as to avoid duplication of parts in so far as possible. Thus, if the machine is capable of dispensing three different types of beverage it would obviously be possible to employ three separate, distinct and complete mechanisms within the cabinet to effect the three dispensing operations. However, in accordance with the present invention a single mixing chamber is employed, although provision is made to avoid the possibility of one drink bearing the taste of the next preceding drink, and to repeat, other duplication of parts is avoided so far as conveniently possible.

Another object of the invention consists in constructing and positioning the various instrumentalities within the cabinet as compactly as possible in order that the linear dimensions of the cabinet may be maintained at a minimum. Various factors which contribute to the accomplishment of this object will become apparent during a reading of the ensuing specification.

Another object of the invention is to so construct and arrange the equipment within the cabinet as to facilitate the servicing of the machine. One of the most difficult problems in conjunction with a beverage vending machine is that of attending to it properly in order to maintain it in sanitary and operative condition. This problem gives rise to the necessity of having the machine filled with cups, syrup, water and carbon dioxide at all times, removing used cups, collecting coins, and maintaining the actuating mechanism in operative condition. If the machine is in constant use the servicing operation must be performed at frequent intervals, and facilitating the task of servicing the machine is an important consideration in the efficiency and effectiveness of the machine.

In accordance with the foregoing desideratum, an important feature of the invention which contributes to the accomplishment of this particular object consists in mounting certain equipment to which access must be had during servicing of the machine upon the door of the cabinet and mounting within the interior of the cabinet certain other equipment or instrumentalities to which access may be readily afforded by reason of the fact that the parts which might ordinarily interfere with easy accessibility are positioned on the door and move into an out-of-the-way position the instant the cabinet is opened. As disposed herein, the equipment or instrumentalities which contain or dispense the liquids are mounted within the cabinet and the cup magazines, cup dispensers and operating mechanism are mounted on the door. Thus, it may be seen that the liquid dispensing mechanism is positioned within the cabinet and the cup dispensing apparatus, together with the operating mechanism, is mounted on the door of the cabinet. Not only does such a construction facilitate access to the various parts involved, but it further insures the fact that liquid being poured into the syrup tanks or the water tank positioned within the interior of the cabinet will not splash or spill upon the mechanism mounted on the door of the cabinet.

Additionally, there have been incorporated into this invention certain improvements or special features. For example, the measuring valve shown herein is a modification of that measuring valve which is the subject of my patent application Patent No. 2,175,753, filed June 18, 1938, for a Measuring valve. The valve shown in that case has been modified by substituting for the single oblong ports, a series of round ports which are believed to provide greater bearing service for the shoes which act as closure members. Additionally, a plurality of these measuring valves have been incorporated into a single compact assembly in association with a single mixing chamber.

A unique valve for controlling the flow of carbonated water is under a comparatively heavy static pressure of some eighty pounds or more, and it is essential that there be no leakage of the carbonated water through the mechanism when the valve is closed. A feature of the valve provided by this invention is the utilization of a sleeve to which the valve is positively attached. The valve remains seated by the pressure of the carbonated water and is unseated in a smooth axial movement along the line of flow. This assures a uniform flow of carbonated water during the period of time selected which results in the exact quantity of water reaching the mixing chamber, a very essential feature as the machine is designed to dispense an exact quantity of fluid.

These and such other objects as may hereinafter appear are obtained by my invention described below and shown in the drawings, comprising nine sheets, in which:

Figure 1 is a front view in perspective of the vending machine;

Figure 2 is a view in elevation of the cabinet's interior and of the equipment mounted on the inside wall of the door;

Figure 3 is a plan view with the door closed taken on the line 3—3 of Figure 2;

Figure 4 is a side view in elevation of the mixing chamber assembly including the syrup measuring valves and the water valve;

Figure 5 is a top view of the mixing chamber assembly;

Figure 6 is a cross sectional view taken on the line 6—6 of Figure 5;

Figure 7 is a cross sectional view taken on the line 7—7 of Figure 6;

Figure 8 is a front view of an adjustable lever arm of a syrup measuring valve;

Figure 9 is a plan view of the power unit coupled to the measuring valves and of the light control and cup dispenser lever trains;

Figure 10 is a side view taken on the line 10—10 of Figure 9 and shows the drink totalizer mechanism;

Figure 11 is a plan view of the mechanism for revolving the cup magazines taken on the line 11—11 of Figure 2;

Figure 12 is a view in elevation of the power unit taken on the line 12—12 of Figure 9; and Figure 13 is a rear view of the timing mechanism mounted on the power unit.

Touching, by way of introduction, upon certain general features of the invention, the numeral 10 identifies a cabinet to which is swung a door 12 by hinges 14, and a top flap 16 which in closed position overlaps the upper edge of the door 12. The door 12 carries locking means 18, 20 and 22, connected by a bar 24 which is actuated by a lever 26. To close the cabinet, the top flap 16 is raised, the door 12 is closed, and the lever 26 is placed in locked position. The top flap 16 is then closed down and fastened by means of a lock 28 and a hook 29.

Within the cabinet 10, the numeral 30 identifies a refrigerating compressor unit connected by appropriate tubes 32 to a brine tank 34, which may equally well be some other type of cooling unit. The compressor 30 is controlled by a conventional temperature regulator 36. A tank 38 contains sufficient water or other mixing fluid to handle all of the syrups or other drink bases that can be placed in three syrup tanks 40, 42 and 44 in the ratio of four or five parts of water to one part of drink base. That is to say, where one ounce of syrup is mixed with five ounces of water, which is quite generally the mixing formula, the capacity of the water tank 38 may be four or five times as great as the gross capacity of all the syrup tanks.

The water descends by gravity from the tank 38 to a water pump 46, which raises the water pressure to perhaps 110 pounds per square inch and forces the same through suitable tubing to coils in the brine tank 34, wherein the water temperature is dropped to a desired point. The water pump is controlled by a switch 48 actuated by a drop in pressure in the water line. A cylinder of carbon dioxide 50 is positioned in front of the water tank 38 and the water pump 46 and is suitably connected to a fluid controlled valve 52 and a carbonator 54. The fluid controlled valve 52 is the subject of my application Serial No. 289,768, filed Aug. 12, 1939. The carbonator 54 is the subject of my application Serial No. 210,893, filed May 31, 1938, for a "Carbonator." The brine tank 34 and three syrup tanks 40, 42 and 44, are positioned within an insulated compartment 56.

*The arrangement of the control mixing and dispensing means*

Before describing further the water, gas and syrup lines to the mixing assembly, attention is invited to the disposition of the operable elements of this vending machine. As may be seen in Figure 2, the syrup tanks 40, 42 and 44 are directly in front, and may be readily filled. Any service that the brine chamber 34, the carbonator 54, the fluid controlled valve 52 or the cooling unit 30 may require can be had with a minimum of difficulty. The carbon dioxide tank 50 or the water tank 38 can be lifted completely clear of the cabinet either through the front or through a special side door. A waste pail 60 may be lifted directly through the front with sufficient clearance to avoid spilling any of its contents.

Similarly, accessibility characterizes the equipment mounted on the interior of the door. A multiple cup magazine 62 comprising a plurality of cylinder segments 64 can be quickly filled. A coil selecting mechanism 66 drops accepted coins into a till 68, which may be readily unhooked for the purpose of emptying. A spring motor actuating unit 70 carrying lever arms 72, 74 and 76, is centrally disposed on brackets 75 and 77 and may be readily disconnected from links 78, 80 and 82. It is this arrangement of syrup, water and brine tanks, carbon dioxide cylinder, measuring valves, mixing chamber, waste pail, and cooling unit mounted in easily accessible positions, in combination with the equipment mounted on the door, which constitutes one of the features of this invention.

The mechanism on the door carries parts which register with complemental parts on the equipment in the main portion of the cabinet when the door is in closed position. More specifically, upon closing the door 12, lugs 84, 86 and 88 on links 85, 87 and 89, slip into holes 90, 92 and 94 of actuating elements 96, 98 and 100. Similarly, used cup chutes 102 and 104 with swinging doors 103 and 105 and a splashed liquid drain 106 discharge into the waste pail 60 when the door is closed. The compartment 56 is recessed to avoid interference with the multiple cup magazine 62. Finally, a pouring spout 108 projects through a window 110 of a casing 114 mounted on the door 12 when the latter is closed and discharges into a positioned cup 112 in the cupola 114. Here again, units requiring re-filling, such as the cup magazine, or emptying, such as the coin till, or repairing and adjusting, such as the power unit, are readily accessible when the door is open. When the door is closed, they cooperate with the equipment inside the cabinet to form a compact, automatic, selective, bulk, liquid dispensing machine.

It will be observed that the complementary holes and lugs constitute a coupling and that these couplings, see Figure 3, are not far distant from the plane of the opening of the door. It will also be appreciated that each of the lugs 84, 86 and 88 describe an arc with a hinge of the door as a center when the door is swung open and that these lugs, as the door is swung closed, do not approach the holes 90, 92 and 94 of the actuating elements 96, 98 and 100 squarely from the front but along the arc of their respective circles. It is necessary, therefore, to taper the tips of the lugs as may be seen in Figure 4 so as to assist in registry. Moreover, it will be appreciated that the closer the row of actuating elements 96, 98 and 100 are to the plane of the door opening, or more exactly if the row of actuating elements 96, 98 and 100 could lie in a plane which passes through the hinge, the lugs, 84, 86 and 88 would most readily register exactly with the holes. A feature of this invention is the positioning of the actuating elements 96, 98 and 100 as near the plane of the door opening as possible in order that on the closing of the door there will be a minimum lateral movement between the lugs and the corresponding holes in the actuating elements.

*The carbonator and the mixing assembly*

One of the features of this machine is the compact arrangement of means for carbonating water and mixing it with one of several drink bases to form a finished drink. Tracing the flow of water, it leaves the brine tank cooling coils by tube 116, (Figure 3) passes through the fluid controlled valve 52, and enters the carbonator 54 by means of a tube 118. The carbon dioxide gas from the tank 50 enters the control valve 52 by a tube 120 and continues to the carbonator 54 by a tube 122. The carbonator 54 produces a desired solution of carbon dioxide gas in water and this carbonated water advances through tube 124 to the mixing chamber assembly 58.

Figures 4 through 8 disclose the mixing assembly in detail. A block 126 houses three cylindrical chambers 128, 130 and 132, and three passageways 134, 136 and 138 located respectively above these cylindrical chambers. Each passageway is connected with its respective cylindrical chamber by inlet ports 139, which are circular in cross section. Mounted above the recesses 134, 136 and 138 is a casting 200 having inlets 202, 204 and 206, which are in registry with the passageways 134, 136 and 138. Into the bottom of each cylindrical chamber is drilled a row of discharge ports 140. Air vents 142, 144 and 146 drilled into the block 126 connect each cylindrical chamber to the mixing chamber 190 hereinafter described. Seated as at 148 in each cylindrical chamber is a shaft 150, which carries two sets of pins 152, 154 and 156, 158 mounted at right angles to the axis of the shaft 150. Mounted on the outer end of the pins 152 and 154 is a shoe 160, which consists of a cylindrical segment having an outside diameter corresponding to the inside diameter of the cylindrical chamber. The shoe 160 is maintained in close contact with the wall of the cylindrical chamber 130 by means of expansion springs 162 and 164. Similarly, a shoe 166 is held by springs 168 and 170 in close contact with the wall of the cylindrical chamber. A head 172 supports the front journals 174 of each shaft 150, the outer end of which carries a spring 176 and one of the lever arms 96, 98 or 100, hereinbefore referred to and which may be termed actuating elements. The actuating elements are bent at their outer extremities so that the apertures 90, 92 and 94 will more readily receive the lugs 84, 86 and 88. The lower ends 182 of each of the lever arms 96, 98 and 100 carry bolts 184 and lock nuts 186. By changing the setting of the bolts 184, the length of stroke of the lever arms may be varied and controlled as desired, thereby lengthening or decreasing the period during which certain syrup measuring and metering valves, hereinafter to be described, are opened during actuation of the machine, and thereby similarly controlling the amount of syrup dispensed during any given drink vending operation. Each of these cylindrical chambers with their opening and closing members may be referred to as a measuring valve.

A mixing chamber 190 is formed by a casting 192 fastened to the lower side of the block 126 by bolts 194 and 196 and may readily be removed for cleaning. The mixing chamber is provided with the single pouring spout 108, and with grooves 198 and 199 which communicate the vents 142, 144, 146 with the interior of the mixing chamber 190. It will be observed that air can ascend through the spout 108 into the mixing chamber and thence to the ports 140 communicating with the measuring valves and also a port 210 leading to the carbonated water valve. The presence of air introduces all of the undesirable effects of oxidation and in some existing structures, mold and decay of syrup, not eliminated from the mixing chamber quickly, build up and are difficult to remove. The design of the mixing chamber 190 facilitates quick cleaning, and the ports 140 and 210 may be readily cleaned when the mixing chamber 190 has been detached from the block 126.

The syrup inlet tubes 202, 204 and 206 are connected respectively with the tanks 40, 42 and 44. A plan view of these tanks may be seen in Figure 3. The tank 44 has double the capacity of the other tanks and is intended for that syrup or drink base which is currently the leading seller. The two smaller tanks 40 and 42 have a cross sectional shape of a right-angled trapezium and are positioned as shown in Figure 3 in order to permit direct vertical drainage into the inlet 202 and 204 of the mixing assembly 58.

*The carbonated water valve*

In order to assure the flow of like quantities of carbonated water into the mixing chamber 190 during equal periods of time, the operation of this mixing assembly being based upon time controlled lever trains, a novel carbonated water valve is provided. The back wall of the mixing chamber 190 is drilled and threaded to receive a valve unit 208, which includes the delivery port 210, a passageway 212 in which rides a sleeve 214 carrying a pin 216, and a valve member 218 carrying a valve member normally urged against an inward shoulder or seat 220 by means of a compression spring 222 and by the carbonated water pressure in the tube 124. A coupling 224 maintains the tube 124 leading from the carbonator 54 in registry with an inlet 226 of the valve unit 208. Movement of the sleeve and pin away from the mixing assembly will unseat the valve and permit the water to rush into the mixing chamber 190. This movement is obtained by an arm 230 actuated by a U-shaped lever 232 having a front bar or gang 234, upon which rest the bolts 184 shown in Figure 8.

Operation of the mixing assembly

Inasmuch as the three syrup measuring or metering valves operate in the same identical manner it will be sufficient in describing the operation of the mixing assembly to describe the operation of only one syrup valve, as for instance, the one which appears to the left of the assembly as shown in Figure 7. Thus, when the machine is in the idle position shown in Figure 4, the lug 88 of the link 89 engages the hole 90 of the lever arm 96 in the idle or inoperative position. As mentioned heretofore, this registry of the lug 88 with the hole 90 occurs when the door 12 is in closed position. The valve shoes 161 and 167 occupy the position shown in Figure 7. The chamber 131 is filled with syrup flowing downwardly by gravity, from the tank 40 above. Upon actuation of the lever arm 96 in a counter-clockwise direction, as viewed in Figure 7, the shoes 161 and 167 move counter-clockwise, the shoe 161 blocking the syrup intake ports 139 and exposing the air vent 142, while the shoe 167 normally covering the ports 140 opens said ports, thereby permitting the syrup to drop into the mixing chamber 190.

Simultaneously, as the lever arm 96 moves counter-clockwise, the adjustable pin 184 engages the plate 234 of the U-shaped lever 232, which, as appears in Figure 6, actuates the lever 230 to the left. Thereupon, the sleeve 214 opens the valve 218 in the carbonated water line. Opening of the carbonated water inlet and the discharge of the syrup takes place simultaneously and a quick mixing action occurs in the mixing chamber 190. Attention is invited to the fact that the syrup measuring valves and the mixing chamber are steeply sloped in order that the finished drink will flow quickly and by gravity out of the spout 108. It is highly desirable that the finished drink leave the spout 108 by gravity alone and not under pressure, and for this reason, the parts 210 and 226 are small in comparison with the diameter of the spout 108.

The size of the syrup discharge ports 140 in relation to the port 210 is such that the syrup normally is fully emptied into the mixing chamber before the water is shut off. Stated differently, closing the water valve slightly lags the completion of the gravity discharge of the syrup from the mixing chamber. This is very important, because a single mixing chamber is being used to mix several types of drinks, and it is desirable that the last ounce or so of water act as a flush. As one watches the finished drink come out of the spout, the last half ounce or so is almost clear water. This flushing of the mixing chamber 190 after each mixing is responsible for that very desirable result which this invention obtains, namely, no taste in a drink of the last previous different drink served.

Multiple magazine cup dispensing mechanism

The cup dispensing mechanism may be seen in Figures 2, 3, 9 and 11. This mechanism must perform two functions: firstly, the dropping of one cup into filling position immediately before pouring, and secondly, the positioning of a loaded magazine of cups in place of any magazine that has been exhausted.

Describing the features of the cup dispensing mechanism in the order of the functions named above, 114 is a casing closed from the interior of the machine in order to prevent customers from reaching into and tampering with the mechanism. The bottom of the casing 114 is slit at 242 to permit any spilled liquid to flow down a drain 106; into the back is cut an aperture 110 through which the pouring spout 108 passes upon the closing of the door 12; and into the top is cut an aperture through which a cup 248 may be dropped into a positioning means 112 comprising a circular, cup-shaped, metallic holder, a yoke or some other suitably shaped member attached to a door 252 (Figure 1) pivotally mounted within the front door of the cabinet. From the outside, access may be had to the casing through the door 242. Transparent glass 254 aided by a light 256 which is illuminated during operation of the machine, permits the purchaser of a drink to see the cup drop into filling position and the drink dispensed.

The cup dispenser itself is identified by the numeral 258 and may be of the type disclosed in my application Serial No. 214,432, filed June 18, 1938, for a "Cup dispenser." It is held in position with respect to the door 12 by screws 260 holding it to a bracket 262. It is actuated by reciprocating an arm 264 shown in Figure 9.

The lever train imparting this reciprocating motion to the arm 264 commences with the actuation of any one of a plurality of draft arms 246, 246a and 247. Thus, the purchaser grasps a lever arm such, for instance, as the arm 246, and presses it down. In so doing, he rotates a jack shaft 266. At the end of the shaft 266 is mounted a lever 268, which in turn is coupled to a lever 270 fulcrumed on a stub axle 272 mounted on the cup dispenser 258. The downward stroke of the draft arm 246 causes the lever 270 to oscillate, so that a lug 274 riding in a hole 276 of the arm 264 causes the arm to move in a clockwise direction. This movement releases one cup.

As an extension of this lever train, there is provided a circuit switch 280 which controls the light 256 and is opened or closed by action of a lever arm 282. A triangularly shaped lever 284 carries lugs 286 and 288. Upon actuation of the lever 284, the lug 288 clears a lug 290 on an arm 292 pulled by a spring 294. This action locks the lever 284 against the lever arm 282. When a patron or customer opens the door 252, a segment 296 attached thereto engages the bottom of the arm 292, see Figure 2, and against the pull of the spring 294 forces the same back to normal position, thereby permitting the triangular lever 184 to resume normal position and releasing the lever arm 282, which extinguishes the light. Affixed to the arm 292 and slidably engaging a locking finger 293 is a link 295. When the casing door 252 is opened, the locking finger 293 engages the lug 274, preventing actuation of the cup dispensing arm 264. When the door 252 is open, therefore, the cup dispenser is locked against actuation.

The multiple magazine which is employed is illustrated as being generally circular and comprises a plurality of slit cylinders 64 mounted on a shaft 302, which is vertically positioned in journals 304 and 306 in a bracket 308 and a circular table 310, respectively. There is clearance between the segmented cylinders 64 and the table 310 to permit free rotation of the multiple magazine assembly. Directly above the cup dispenser 258 and below the magazine assembly is a delivery chute 312 through which cups descend. An opening 314 is formed in the table 310 to permit passage of the cups.

Rigidly affixed to the shaft 266 is a lever 316 (Figure 11) which is connected by a flexible link means 318 to a testing finger 320 fulcrumed on a vertical shaft 302 and freely rotatable thereon. The tip of the testing finger 320 is positioned to penetrate an aperture 324 in the delivery chute 312. Rigidly fastened to the shaft 302 is a toothed ratchet 326 mounted immediately below the testing finger 320 and in relation to a pawl 328 mounted on the testing finger 320 at 330 that a spring 332 will press the pawl 328 into engagement with the ratchet. As illustrated and as will presently be more fully described the ratchet 326 has ten teeth.

Turning now to the operation of the multiple magazine cup dispenser, the service man loads each of the magazines, including the one directly above the cup dispenser, so that when the machine is loaded, there is a column of cups extending from the cup 248 to the top of the multiple cup dispenser. The testing finger 320 is withdrawn from the aperture 324 so as not to interfere during loading but is then permitted to press against the column of cups. Attention is invited to a flange 334 at the end of the testing finger 320. This flange is of sufficient width to engage the rims of several cups. When a draft arm such for example as the arm 246 is actuated, the flexible link 318 draws the testing finger 320 in a clockwise motion away from the column of cups in the delivery chute 312. As this occurs simultaneously with the dispensing of a cup by the arm 264, see Figure 9, the testing finger 320 does not interfere with the dropping of the column of cups. This process is repeated until the topmost cup in the stack drops below the bottom of the flange 334 of the testing finger 320. When this occurs, the flexible member 318 causes the testing finger to move in a counter-clockwise motion and to penetrate the area normally occupied by the cup magazine column to some point such as that shown by the dotted line in Figure 11. When the testing finger is so advanced, the pawl 328 engages a notch of the ratchet 326, and on the next stroke of the draft arm 246, the testing finger 320 again moves clockwise, but this time carries with it the ratchet 326. The ratchet is moved by one-tenth of 360°, which causes the shaft 302 to rotate the same distance. Inasmuch as there are five cup magazines on the shaft, the next cup magazine is advanced halfway toward loading position. Attention is also invited to the fact that when the testing finger 320 passes through the aperture 324 for the first time, there are still several cups in the delivery chute 312 above the cup dispenser 258. On the next succeeding stroke of the draft arm 246, the ratchet 326 and the shaft 302 are advanced one more notch, this time bringing a loaded magazine 301 over the opening 314. The cups which have been supported by the table 310 drops into the chute at a moment when the testing finger 320 is withdrawn from the aperture 324. When the draft arm 246 is raised, the testing finger 320 now encounters cups and the ratchet and pawl cease to operate until that magazine of cups 301 has been exhausted. Thus, two strokes of the draft arm 246 are required to advance a loaded magazine into delivery position above the chute 312.

*The power unit and timing mechanism*

Referring generally to Figures 9 to 13 inclusive, it will be seen that the power unit is a self contained unit, comprising side frame members 350 and 352 maintained in spaced relationship by bolts and spacer tubing such as 354 and 356. The unit is designed to be interposed between the draft arms or external controls 246, 246a and 247 on the shaft 266 and the three arms 96, 98 and 100 for actuating the syrup measuring valves of the mixing chamber assembly 58. Support for the unit is obtained by means of brackets 76 and 77.

Inasmuch as the action of any of the spring actuated lever trains is the same as any other, only one will be described. The shaft 266 carries the link 78, which is coupled to the arm 72 pivoted at 362 on a bracket 364 rigidly secured to a slide 366. As may be seen in Figure 12, the slide 366 carries two slots 368 and 370 which slide on pins 372 and 374 suitably capped. The slide 366 carries a rack 376 and its normal position is that shown in Figure 12. Engaging the rack 376 is a gear 378 riding free on a shaft 382. Affixed to the gear 378 is a notched cam 379 against the surface of which rides a pawl 381 mounted on the inside face of a disk 380. A spring member 383 holds the pawl 381 against the face of the notched cam 379. The disk 380 overlaps the rack 376 and carries on its outer surface a rotatable coupling 384, the lower end of which is held by a power spring 386 anchored by a hook 388 fastened rigidly to the frame 352 by a bracket 390.

Examining now Figure 13 in conjunction with Figure 9, the opposite end of the shaft 382 is seen to bear a cam 392 on the surface of which rides a roller 394 mounted on an arm 396 pivoted on a stub shaft 398 and held in contacting position by a spring 400. The arm 89 is pivotally fastened to the arm 396 by a pin 404 and carries at its outer end the lug 88. Figure 13 shows the cam in normal position. In this connection, attention is directed to the fact that a clockwise motion of the cam 392 will result in little or no appreciable effect upon the link 89 until the cam 392 has turned through 180° of arc.

Tracing now the train of mechanism which actuates the measuring valve arm 96, the draft arm 246 is drawn downward, thereby raising the slide 366, which, as viewed in Figure 12, rotates the shaft 382 counter-clockwise, but, as viewed from the opposite side in Figure 13, rotates the shaft in a clockwise motion. The point of greatest contraction for the spring 386 is its lowermost position. As the rack 376 moves upward, it rotates the notched cam 379 counter-clockwise which, through the pawl 381, causes the disk 380 to rotate counter-clockwise. The coupling 384 is advanced past its upper dead center against the tension of the spring 386. When the coupling 384 passes dead center the draft arm 246 is released, the spring 386 commences to contract which causes the pawl 381 to slide along the surface of the notched cam 379, and the gear and cam, being freely rotatable on shaft 382, reverse direction and as the rack drops downward toward normal position under the impulse of a spring 377, return to the position shown in Figure 12. As the spring 386 commences its power stroke, the cam 392, see Figure 13, forces the roller 394 and the link 89 to the right, or, as viewed in Figure 9, to the left, which causes actuation of the measuring valve arm 96 and of the mixing chamber assembly.

It is apparent that a timing element or speed regulator must be introduced into the mechanism, or the action of the spring 386 will be so rapid or irregular as to introduce an improper amount of either syrup or water into the mixing chamber 190. The timing device may be seen in Figures 10 and 13, wherein the shaft 382 is moving clockwise. Mounted on the shaft 382 is a gear 406, which engages a similar gear 408 mounted on a shaft 410. Rigidly fastened to the shaft 410 is an arm 412 carrying at its outer extremity a roller 414. In the same vertical plane as the roller 414, see Figures 9 and 10, is a lug 416, which forms part of a carriage 418 carrying similar lugs 420 and 422, which are adapted to engage rollers 424 and 426, respectively To the bottom of the carriage 418 is affixed a rack 428 which is held in reciprocating position between a gear 430 and rollers 432 and 434. The rollers 432 and 434, respectively, limit the stroke of the carriage 418. A spring, the function of which will soon be described, 436 is fastened to a fixed pin 438.

The gear 430 is keyed to a shaft 440, to which is also keyed a gear 442. Riding freely on the shaft 440 is a large gear 444, carrying a pawl 446 directed against the teeth of the gear 442 by a spring 448. The large gear 444 meshes with a pinion gear 450, which in turn, through a gear 452, engages a gear 454. Mounted on the shaft of the gear 454 is a wind-resistance member 456, which acts as a governor.

Tracing the action of the timing mechanism as shown in Figures 10 and 13, the arm 412 passes through 180° of arc during the upstroke of the slide 366, see Figure 12, there being no immediate or direct resistance to the rotational movement of the arm during this portion of the stroke. By this statement it is meant that although the draft arm and the rack bar 366 move in direct opposition to the resistance of the spring 386, thereby cranking or energizing the spring motor, the arm 412 moves freely about the stub shaft 410 during this time. When the rotatable coupling 384 passes dead center, the roller 414 on the arm 412 engages the lug 416 on the carriage 418. A movement of the carriage 418 from left to right commences, which, through the rack 428, imparts to the gear 430 a clockwise motion. This motion is also imparted to the gear 442, which is locked by the pawl 446 to the large gear 444. By means of this gear train, the movement of the carriage 418 from left to right is controlled by the wind-resistance blade 456. The size of this wind-resistance blade 456 may be altered to vary the speed of the gear train.

Just before the roller 414 returns to its normal position, namely, that shown in Figure 10, it clears the lug 416, whereupon the spring 436 returns the carriage 418 to normal position. This return of the carriage 418 to normal position is not delayed by the time mechanism gear train, for the reason that a counter-clockwise motion is imparted by the rack 428 to the gear 442 and the edge of the pawl 446 is such that it slips the teeth of the gear 442 during a counter-clockwise motion.

Summarizing the action briefly, during the operating period of the principal train, it is controlled by the timing mechanism operating through the pawl 446, but upon the termination of the stroke of the principal train, the timing mechanism is disengaged and the carriage 418 returns to its first position under the impulse of the spring 436.

Drink tabulating device

Ancillary to each train is a tabulating device, which may be seen in Figures 9 and 10. Two of these devices, namely, those that are coupled to the trains controlling the measuring valves for the two smaller tanks, are identical. As will be recalled, each of these two tanks have half the capacity of the large tank. The tabulating device for the train controlling the measuring valve for the large tank will be described separately.

Referring to Figure 10, the tabulating device consists of a shaft 450 mounted in a journal 452 carried by a supporting member 454. Returning for a moment to Figure 12, attention is invited to the gear 378, which drives a gear 456 mounted on one end of a shaft 458. The other end of the shaft 458 is seated in a collar 459 mounted on a shaft 463 which will be driven clockwise, as viewed in Figure 13, by a rocker blade 461. The surface of the collar 459 engaged by the blade 461 carries oppositely disposed notches 465, with surfaces tapering toward the notches. Inasmuch as the shaft 458 rotates 180° and then reverses direction, the blade 461 rotates the collar 459 and the shaft 463 by 180° and then likewise reverses direction and picks up the notch on the other side of the collar 459 for the next cycle.

The shaft 463 carries a worm 460. The worm 460 engages a gear 462 and advances the gear 462 by one tooth on each rotation of the shaft 458, but inasmuch as the shaft 459 is rotated only 180° on each cycle of the machine, the shaft 463 will advance the gear 462 by one-half tooth only for each cycle. It follows that each tooth records two drinks. The pointer 468 indicates the position of the gear, the periphery of which is numbered at every fifth tooth. When the dispensing machine has been freshly filled, each tabulating gear may conveniently be set at zero.

Above the gear 462 is a collar 470, upon which rests a blocking or locking member 472, the function of which is to latch the rack-bar 366 against upward movement and which comprises as may be seen in Figure 9, a flat piece of metal supported at one end by the collar 470 and having its opposite end arranged for sliding engagement in a slot 474 formed in the side frame member 352. See also Figure 12. The blocking member is enlarged at one end and is shaped to form a closed cam 478 within the confines of which is positioned the shaft 450 to serve as a follower for the cam. A cap 478 holds the parts in assembled position.

The gear 462 carries a lug 482, which is disposed adjacent to the blocking member 472 when the gear 462 is in the zero position, as is illustrated by gear 466 in Figure 9. The shaft 458 rotates in a clockwise direction, which, as viewed from above in Figure 9, causes the gear 462 on the shaft 450 to rotate in a counter-clockwise rection. As the gear advances counter-clockwise, the lug 482 advances too, until it engages the outer curved edge 484 of the blocking member 472 thereby moving the blocking member 472 from the position shown in the left hand train of Figure 9 to the position shown in the center train. When this occurs, the blocking member shifts into a position with the tip 486 projecting beyond frame member 352 into the path of the slide 366 to forestall movement of the latter.

The tabulating mechanism for the train controlling the measuring valve of the large tank is at the right in Figure 9 and in Figure 10 is at the left. A gear 466 carrying a lug 488 is identical to the gear 462 above described. A blocking member 490, however, differs from the blocking member 472 in that it carries a lug 492 projecting downwardly. When the gear 466 is placed in the zero position, the lug 488 is in the position shown in Figure 9 and abuts a freely rotatable arm 494. The assembly in this tabulating device also differs from the previously described tabulating device in that the lug 488 does not project into the plane of the blocking member 490.

The purpose of this variation is to enable the gear 466 to make two rotations before engaging the blocking member 490. Describing the action, the gear 466 approaches its first complete revolution with the lug 488 riding beneath the blocking member 490 and engaging the arm 494. The gear 466 continues to rotate until the arm 494 engages the lug 492 on the blocking member 490, whereupon an offset journal 496 is brought into position on the shaft and thereby causes the blocking member 490 to project beyond the frame member 352, in exactly the same fashion as described in the previous tabulating mechanism. Finally it may be stated that the tabulating mechanism or counter may be returned to its zero position or reset by means of an operator pressing down on a gear such as 462, thereby disengaging the gear 462 from the worm 458, against the resistance of the spring 463. When the tabulating gear 462 has been so disengaged it may be rotated to return it to a starting position.

*Operation*

Describing the operation of the machine as a whole, the purchaser of a drink approaches the machine, which appears as in Figure 1. Each of the display panels 500, 502 and 504 carries an identifying sign for some particular drink, and arcs 506, 508 and 510 which may be in the same color as the background of the respective signs lead to the external controls 246, 246a and 247. The purchaser selects the drink desired, which, let us say, is controlled by the draft arm 246, and drops a coin into a coin aperture 512. Assuming that a nickel, as contrasted to a slug, has been dropped into the coin selector 66 (Figure 9), which is of a conventional type, and that the machine is loaded, the coin selector permits free vertical movement of the link 251 to which the shaft 266 is connected by the arm 253. The first step in the movement of the draft arm 246 is to actuate an interlocking means which extends between the coin mechanism and the shaft 266 in such a manner that if one of the draft arms is partially or fully depressed it is impossible to actuate either of the remaining arms. Having actuated the interlocking means, the stroke continues and accomplishes three things: the slide 366 is raised, the cup dispensing mechanism and the lever train commencing at 268 are actuated, and movement is transmitted to the cup testing lever train commencing at 316. Attention is invited to the fact that when the draft arm 246 is in its lowermost position, it will have carried the rotatable coupling 384 just over dead-center position thereby commencing actuation of the mixing chamber assembly. During the upward stroke of the rotatable coupling 384, the cup dispensing mechanism has dropped a cup from the cup dispenser 258 into the cup positioning means 250 mounted on the door 252 of the cupola 114 and the light 256 has been switched on.

With the light on and the cup in position, the rotatable coupling 384 commences its downward power stroke. As previously explained, during the upstroke of the rotatable coupling 384, the cam 392 performs no work upon the train of mechanism which includes the lever 396 because of the shape of the cam 392. When the downward stroke of the rotatable coupling 384 commences, however, the cam 392 quickly forces the rod 89 outward and holds it there during the balance of the stroke. The lug 88 riding in the hole 90 of mixing chamber valve arm 96 actuates the entire mixing chamber assembly as hereinbefore described. Just as the rotatable coupling 384 approaches its normal position, the roller 394, see Figure 13, is permitted by cam 392 to snap back into closed position by action of the spring 400. This returns the syrup measuring valve to the position shown in Figure 7, causing the chamber 130 to re-fill with syrup preparatory to the next time it is used. The purchaser opens the door 252 of the machine to afford access to the interior of the casing 114, and in so doing, causes the lever 292 to snap back lever 384 to the position shown in Figure 9, which turns off the light.

In the event that the patron has introduced a slug into the coin selector mechanism 66, that mechanism will permit only a partial stroke of the link 251 which being connected to shaft 266 will permit only partial actuation thereof. Each draft arm is provided with a spring take-up means of a conventional design which will permit complete actuation of a draft arm while the shaft 266 remains immovable. Such actuation takes place against the impulse of a strong spring which goes far in preventing abuse of the machine.

Attention is also invited to the space between the rack, such as 366, and the blocking member 472, which space may best be seen in Figure 12. The coin selector mechanism 66 is of the type which returns a deposited coin after a partial actuation of the link 251. In order that this partial actuation may occur, it is essential that the rack 366 be permitted to rise a short distance, hence there is provided the space between the top of the rack 366 and the blocking member 472.

The disclosure above outlines the principal features of my invention. The nature of a machine for mixing and vending finished drinks in bulk is such that considerable mechanism is involved, but the detailed description of that mechanism should not be permitted to interfere with the broad principles involved herein. The applicant has provided a selective vending machine for carbonated drinks and has equipped that machine with a plurality of simple mechanical motors for causing a selected drink to be delivered. It is recognized that a wide range of variations are possible to effect the attained result. It must additionally be appreciated that various features and principles of the invention may be incorporated in machines for vending merchandise other than beverages and this fact should be taken into consideration in construing the ensuing claims.

Having described my invention, what I claim as new and desire to secure by Letters Patent of the United States, is:

1. In a machine of the character described, in combination, a mixing chamber, means for introducing a drink base into said mixing chamber, and means for introducing selected amounts of a liquid and drink base concurrently into the mixing chamber, said latter named means comprising means for maintaining the liquid at a substantially constant pressure during a flow period and means for predetermining the period of flow.

2. In a machine of the character described, in combination, a mixing chamber, means for introducing a drink base into said mixing chamber, and means for introducing selected amounts of a liquid and drink base concurrently into the mixing chamber, said means comprising a pump for forcing the liquid through a valve into the mixing chamber at a substantially constant pressure and a governor controlled lever train responsive to an external control and coupled to the liquid valve, whereby actuation of the lever train will hold open the liquid valve until the desired quantity of liquid and drink base have been introduced to the mixing chamber.

3. In a machine of the character described, in combination, a mixing chamber, means including a valve for introducing a liquid at a substantially constant pressure into the mixing chamber, a plurality of measuring valves for an equal plurality of drink bases, said valves having outlets into the mixing chamber, and means for selectively emptying a single measuring valve into the mixing chamber concurrently with the admission of a selected quantity of liquid thereto, said latter named means comprising a series of lever trains each of which connects an external manually operated control to each of the measuring valves and to the liquid valve, together with a speed regulator adapted to control the stroke of each lever train.

4. In a machine of the character described, in combination, a mixing chamber, means including a valve for introducing carbonated water at a substantially constant pressure to the mixing chamber, a plurality of measuring valves for an equal plurality of drink bases, said valves having outlets into the mixing chamber, an external manually operated control for each drink base, a mechanism connecting each external control to its associated measuring valve and to the carbonated water valve, and means for disengaging the mechanism from its external control during an actuating stroke and for simultaneously coupling such mechanism to a source of power.

5. A manually operated drink dispensing machine, said machine comprising, in combination, dispensing means, a manually driven motor for operating the dispensing means, said motor being adapted to remain idle and at rest between dispensing operations, and an external, coin controlled, manually operated lever for operating the machine, said lever being constructed and arranged to energize the motor during a portion of its stroke and to release said motor for operation when a predetermined point in the stroke is reached.

6. In a machine of the character described, in combination, a mixing chamber, means including a valve for introducing carbonated water at a substantially constant pressure to the mixing chamber, a plurality of measuring valves for an equal plurality of drink bases, said valves having outlets into the mixing chamber, an external manually operated control for each drink base, a mechanism connecting each external control to its associated measuring valve and to the carbonated water valve, and means for disengaging each mechanism from its external control when a predetermined point has been passed during an actuating stroke and for simultaneously coupling the mechanism to a governor controlled spring motor which completes the stroke.

7. In a machine of the character described, in combination, a cabinet containing means for selectively dispensing a plurality of different drinks in bulk, said means comprising a mixing chamber communicating with a carbonated water valve, a plurality of measuring valves for selectively introducing various drink bases into the mixing chamber, a control means for each measuring valve in train with the carbonated water valve; and a hinged element carrying a plurality of external manually operated control means for selectively determining the particular drink to be dispensed and a speed controlled lever train extending from the external control means and arranged to terminate in an element positioned to register with and engage the corresponding measuring valve control means when the hinged element is in closed position, said hinged element additionally carrying means for positioning a receptacle to receive a drink being dispensed.

8. In a machine of the character described, in combination, a cabinet containing means for supplying carbonated water, under constant pressure, to a mixing chamber, a valve for controlling said supply, a plurality of measuring valves disposed to drain into the mixing chamber and a lever control on each measuring valve so disposed as to engage a bar for opening the carbonated water supply valve on actuation of any lever control and carrying an actuatable element disposed toward the front of the cabinet; and a door carrying an external control for each measuring valve, a cup dispensing and positioning means actuatable by each external control, and a manually wound, spring actuated, governor controlled lever train for each external control terminating in an element adapted to control on the associated measuring valve when the door is closed, whereby the selective control mechanism on the door may be utilized to cause the admixing of a selected drink by the equipment in the cabinet when the door is closed and whereby the actuating equipment and cup magazines may be swung away from the cabinet by opening the door during a servicing operation so as to avoid spilling of water, syrup or liquid waste upon paper cups or mechanism.

9. In a machine of the character described, in combination, a mixing chamber, means for introducing a selected drink base into said mixing chamber, and actuating means for simultaneously introducing carbonated water under comparatively high pressure into the mixing chamber, said means comprising a valve disposed to reciprocate axially of the fluid line in moving from seated to unseated position.

10. In a machine of the character described, in combination, a mixing chamber, means for introducing a selected drink base into said mixing chamber, and actuating means for simultaneously introducing a carbonated water under comparatively high pressure into the mixing chamber, said means comprising a valve disposed to be seated and unseated in accordance with movement of a sleeve reciprocable axially of said fluid line in response to said actuating means.

11. In a machine of the character described, in combination, means for mixing and dispensing a plurality of different drinks, a plurality of external control means, a lever train for each such means for actuating said mixing and dispensing means to deliver a selected finished drink, and a tabulated locking means for each lever train comprising means for recording the number of actuations of the lever train and a blocking member movable by the tabulator into blocking position against the lever train when a predetermined number of actuations have occurred.

12. A machine of the character described comprising a mixing chamber, means for introducing a liquid at a substantially constant pressure into the mixing chamber, a plurality of measuring valves for an equal plurality of drink bases, each of said measuring valves having an outlet into the mixing chamber, means for emptying one of the measuring valves into the mixing chamber contemporaneously with the introduction of liquid thereto, a plurality of external controls, and means for determining the period of flow of the liquid.

13. A machine of the character described comprising a mixing chamber, means for introducing selected amounts of carbonated water and of a drink base contemporaneously into said mixing chamber, an external control, means for maintaining the carbonated water at a substantially constant pressure during a flow period, and means for predetermining the period of flow, said latter named means comprising a rotatable shaft, a spring maintaining said shaft in normal position, means responsive to the external control for rotating the shaft and expanding the spring past a dead center point whereupon said latter named means ceases to rotate the shaft and the spring returns the shaft to normal position.

14. A machine of the character described comprising a mixing chamber, means for introducing selected amounts of carbonated water and of a drink base contemporaneously into said mixing chamber, an external control, means for maintaining the carbonated water at a substantially constant pressure during a flow period, and means for predetermining the period of flow, said latter named means comprising a rotatable shaft, a driving member on one end of said shaft, a pivoted coupling near the periphery of said driving member, a spring means yieldably anchoring said pivoted coupling to a fixed point on the machine, and means responsive to the external control for rotating said driving member and then releasing it to permit further rotation by action of the spring upon the pivoted coupling.

15. A machine of the character described comprising a mixing chamber, means for introducing selected amounts of carbonated water and of a drink base contemporaneously into said mixing chamber, an external control, means for maintaining the carbonated water at a substantially constant pressure during a flow period, and means for predetermining the period of flow, said latter named means comprising a rotatable shaft, a driving member on one end of said shaft, a pivoted coupling near the periphery of said driving member, a spring means yieldably anchoring said pivoted coupling to a fixed point on the machine, and means responsive to the external control for rotating said shaft and driving member to a point more than 180 degrees from normal position and then releasing it whereby the shaft will complete the last half of one full rotation under the impulse of said spring.

16. A machine of the character described comprising a mixing chamber, means for introducing selected amounts of carbonated water and of a drink base contemporaneously into said mixing chamber, an external control, means for maintaining the carbonated water at a substantially constant pressure during a flow period, and means for predetermining the period of flow, said latter named means comprising a rotatable shaft, a driving member on one end of said shaft, a pivoted coupling near the periphery of said driving member, a spring means yieldably anchoring said pivoted coupling to a fixed point on the machine, a pinion gear on the rotatable shaft, a rack actuated by the external control in engagement with said pinion gear whereby the rotatable shaft may be turned more than 180 degrees by means of the external control to a point where its rotation may be completed by the spring, and means for releasing the rack from driving engagement with the rotatable shaft after the rotatable shaft has been turned to a selected position.

17. A machine of the character described comprising a mixing chamber, means for introducing selected amounts of carbonated water and of a drink base contemporaneously into said mixing chamber, an external control, means for maintaining the carbonated water at a substantially constant pressure during a flow period, and means for predetermining the period of flow, said latter named means comprising a rotatable shaft, a driving member on one end of said shaft, a pivoted coupling near the periphery of said driving member, a spring means yieldably anchoring said pivoted coupling to a fixed point on the machine, a pinion gear freely turning on said rotatable shaft, a shoulder on said pinion gear, a rack actuated by the external control in engagement with said pinion gear, a pivoted pawl member on said actuating member disposed to engage said shoulder whereby rotation of the gear by movement of the rack will through the pawl cause rotation of the rotatable shaft until the pivoted coupling has passed over dead center, at which point the spring continues rotation of the actuating member as the pawl ceases to engage the shoulder on the free turning gear.

18. A machine of the character described comprising a mixing chamber, means for introducing selected amounts of carbonated water and of a drink base contemporaneously into said mixing chamber, an external control, means for maintaining the carbonated water at a substantially constant pressure during a flow period, and means for predetermining the period of flow, said latter named means comprising a rotatable shaft, a driving member on one end of said shaft, a pivoted coupling near the periphery of said driving member, a spring means engaging said pivoted coupling whereby the rotatable shaft is held in a selected position, a pinion gear on the rotatable shaft, a rack actuated by the external control in engagement with said pinion gear whereby the rack may cause the rotatable shaft to turn more than 180 degrees to a point where complete rotation may be effected by action of the spring, means for disengaging the rack from the rotatable shaft after the rotatable shaft has been turned to a selected distance, a tabulating device actuated by each cycle of the machine and means actuated by the tabulating device for blocking actuation of the rack.

19. A machine of the character described comprising a mixing chamber, means for introducing selected amounts of carbonated water and of a drink base contemporaneously into said mixing chamber, an external control, means for maintaining the carbonated water at a substantially constant pressure during a flow period, and means for predetermining the period of flow, said latter named means comprising a rotatable shaft, a driving member on one end of said shaft, a pivoted coupling near the periphery of said driving member, a spring means engaging said pivoted coupling whereby the rotatable shaft is held in a selected position, a pinion gear on the rotatable shaft, a rack actuated by the external control in engagement with said pinion gear whereby the rack may cause the rotatable shaft to turn more than 180 degrees to a point where complete rotation may be effected by action of the spring, means for disengaging the rack from the rotatable shaft after the rotatable shaft has been turned to a selected distance, a tabulating device actuated by each cycle of the machine, and a blocking member actuated by the tabulating device for preventing actuation of the rack, said tabulating device comprising a disk having a lug thereon disposed to engage a lug on the blocking member and drive the same into blocking position with respect to the rack after one complete rotation of the tabulating disk.

20. A machine of the character described comprising a mixing chamber, means for introducing selected amounts of carbonated water and of a drink base contemporaneously into said mixing chamber, an external control, means for maintaining the carbonated water at a substantially constant pressure during a flow period, and means for predetermining the period of flow, said latter named means comprising a rotatable shaft, a driving member on one end of said shaft, a pivoted coupling near the periphery of said driving member, a spring means engaging said pivoted coupling whereby the rotatable shaft is held in a selected position, a pinion gear on the rotatable shaft, a rack actuated by the external control in engagement with said pinion gear whereby the rack may cause the rotatable shaft to turn more than 180 degrees to a point where complete rotation may be effected by action of the spring, means for disengaging the rack from the rotatable shaft after the rotatable shaft has been turned to a selected distance, a tabulating device actuated by each cycle of the machine, and a blocking member actuated by the tabulating device for preventing actuation of the rack, said tabulating device comprising a disk pivoted at its center and having teeth in its circumference and held by a spring in yieldable engagement with a worm portion of a shaft driven by said pinion gear whereby the disk may be set at any position by simply disengaging it from the driving shaft against the spring pressure, and a lug on the face of the tabulating disk disposed to engage a lug on the blocking member after one complete rotation of the disk, whereby the external control may actuate the lever train controlling the mixing of a drink base and carbonated water a predetermined number of times only.

21. A machine of the character described comprising a mixing chamber, means for introducing selected amounts of carbonated water and of a drink base contemporaneously into said mixing chamber, an external control, means for maintaining the carbonated water at a substantially constant pressure during a flow period, and means for predetermining the period of flow, said latter named means comprising a rotatable shaft, a driving member on one end of said shaft, a pivoted coupling near the periphery of said driving member, a spring means engaging said pivoted coupling whereby the rotatable shaft is held in a selected position, a pinion gear on the rotatable shaft, a rack actuated by the external control in engagement with said pinion gear whereby the rack may cause the rotatable shaft to turn more than 180 degrees to a point where complete rotation may be effected by action of the spring, means for disengaging the rack from the rotatable shaft after the rotatable shaft has been turned to a selected distance, a tabulating device actuated by each cycle of the machine, and a blocking member actuated by the tabulating device for preventing actuation of the rack, said tabulating device comprising a disk pivoted at its center and having teeth in its circumferences and held by a spring in yieldable engagement with a worm portion of a shaft driven by said pinion gear whereby the disk may be set at any position by simply disengaging it from the driving shaft against the spring pressure, a lug on the face of said tabulating disk positioned to engage a lug on an intermediate member pivoted concentric with the disk after one rotation of the disk, and a second lug on the intermediate member disposed to engage a lug on the blocking member whereby the tabulating disk may be rotated twice before the blocking member is moved into blocking position with respect to the rack.

22. A machine of the character described comprising a mixing chamber, means for introducing carbonated water at a substantially constant pressure into the mixing chamber, a plurality of measuring valves for an equal plurality of drink bases, each of said measuring valves having an outlet into the mixing chamber, means for emptying one of the measuring valves into the measuring chamber contemporaneously with the introduction of carbonated water thereto, a plurality of external controls, a linkage connecting each external control to one of the measuring valves and to the carbonated water introducing means, and means for determining the period of flow of the carbonated water, said means comprising a motor associated with each linkage and actuated by the forestroke of its associated external control, and means for disconnecting the motor from the external control and for causing the motor to operate the associated linkage during the return stroke of the external control.

23. A machine of the character described comprising a mixing chamber, means for introducing carbonated water at a substantially constant pressure into the mixing chamber, a plurality of measuring valves for an equal plurality of drink bases, each of said measuring valves having an outlet into the mixing chamber, means for emptying one of the measuring valves into the measuring chamber contemporaneously with the introduction of carbonated water thereto, a plurality of external controls, a linkage connecting each external control to one of the measuring valves and to the carbonated water introducing means, and means for determining the period of flow of the carbonated water, said means comprising a motor associated with each linkage and actuated by the forestroke of its associated external control, means for disconnecting the motor from the external control and for causing the motor to operate the associated linkage during the return stroke of the external control, and a single speed control element coupled to all of the said motors for controlling the speed thereof.

24. A machine of the character described comprising a mixing chamber, means for introducing carbonated water at a substantially constant pressure into the mixing chamber, a plurality of measuring valves for an equal plurality of drink bases, each of said measuring valves having an outlet into the mixing chamber, means for emptying one of the measuring valves into the measuring chamber contemporaneously with the introduction of carbonated water thereto, a plurality of external controls, and a like plurality of means intermediate each measuring valve and its associated external control for predetermining the period of flow of carbonated water into the mixing chamber comprising a plurality of aligned shafts, an arm on each shaft, a carriage disposed in proximity to said shafts and having an equal number of lugs to be engaged by said arms after said arms have passed through an arc in excess of 180 degrees, and a governor limiting the speed of said carriage under the impulse of any one of said arms, whereby each shaft may be rotated by its associated external control slightly more than 180 degrees before the arm will engage the lug on the bar, which occurs at approximately the moment when a source of power independent of the external control will rotate the shaft at the velocity permitted by the carriage.

25. A machine of the character described comprising a cabinet, an opening in said cabinet, a door for closing said opening, means for dispensing a beverage within said cabinet, means for actuating said dispensing means disposed on the inner side of said door, and coupling means comprising an element on the actuating means for registering with an element on the dispensing means when the door is closed, said coupling means being disposed close to the plane of the cabinet opening whereby lateral movement of the complementary elements of the coupling means as the door is closed is minimized so as to assist in registering said complementary parts.

26. A machine of the character described comprising a cabinet, an opening in said cabinet, a door for closing said opening, means for dispensing a beverage within said cabinet, means for actuating said dispensing means disposed on the inner side of said door, and coupling means comprising an element on the actuating means for registering with an element on the dispensing means when the door is closed, said coupling means being disposed close to the plane of the cabinet opening whereby lateral movement of the complementary elements of the coupling means as the door is closed is minimized so as to assist in registering said complementary parts, said coupling means comprising a lug engaging a hole for driving action therebetween.

JOHN W. CARLSON.

CERTIFICATE OF CORRECTION.

Patent No. 2,261,338.　　　　　　　　　　　　　November 4, 1941.

JOHN W. CARLSON.

It is hereby certified that error appears in the printed specification of the above numbered patent requiring correction as follows: Page 2, first column, line 3, for "Patent No."2,175,753" read --2,272,184--; and that the said Letters Patent should be read with this correction therein that the same may conform to the record of the case in the Patent Office.

Signed and sealed this 12th day of September, A. D. 1944.

Leslie Frazer (Seal)　　　　　　　　　　　　　　　　Acting Commissioner of Patents.